J. M. HUNTER.
Wagon-Tongue Support.
No. 196,805.          Patented Nov. 6, 1877.
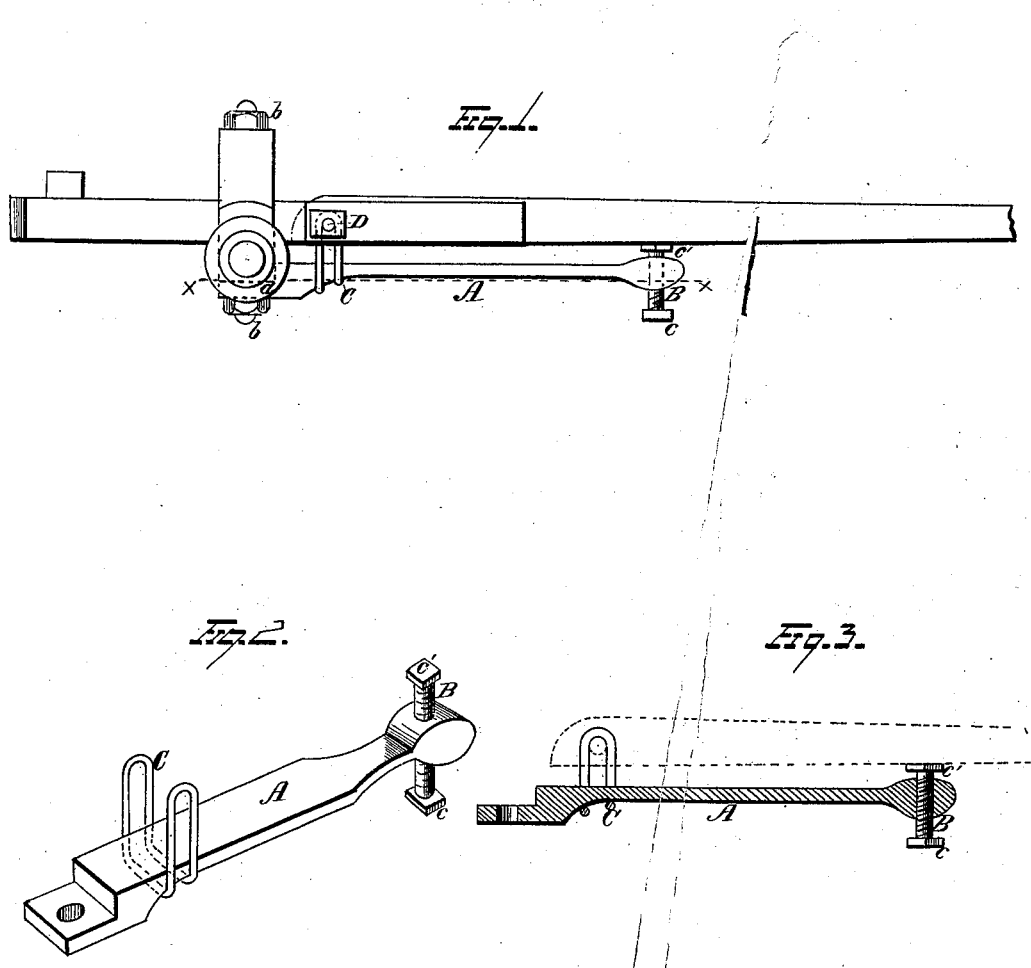
Witnesses:
Ed J. Nottingham
O. P. Wannall
Inventor:
James M. Hunter
by J. R. Nottingham
Ass. Atty.

UNITED STATES PATENT OFFICE.

JAMES M. HUNTER, OF CHENANGO FORKS, NEW YORK.

IMPROVEMENT IN WAGON-TONGUE SUPPORTS.

Specification forming part of Letters Patent No. 196,805, dated November 6, 1877; application filed September 28, 1877.

*To all whom it may concern:*

Be it known that I, JAMES M. HUNTER, of Chenango Forks, in the county of Broome and State of New York, have invented a new and useful Improvement in Supports for Wagon-Tongues, which improvement is fully set forth in the following specification, reference being had to the accompanying drawing.

The object of my invention is to construct a support for wagon-tongues which prevents the tongue from dropping to the ground when the neck-yoke is removed, and which lessens the weight of the tongue upon the necks of the horses. It also allows the wagon-tongue to be lowered or raised. It can be cheaply made, easily adapted to the tongue of any wagon, and by its use the wagon-tongue may be made much lighter than those in ordinary use.

Figure 1 is a side view of the improved support in connection with a wagon-tongue. Fig. 2 is a perspective view of the support. Fig. 3 is a view of the support as shown on the line $x\ x$ of Fig. 1.

The support consists of a piece of iron or wood, one end of which is fitted to the axle, as shown at $a$, and fastened thereto by a bolt screw-threaded at either end, running through the axle, and held in place by the nuts $b\ b$. The forward end of the support is enlarged, as shown in the drawings, and through this enlarged end passes an adjustable screw, B, having flat plates $c$ and $c'$ at either end, one of which is removable.

The wagon-tongue rests upon the upper plate $c'$; but should this upper plate become worn the screw may be reversed, the upper plate becoming the lower plate. By turning the screw B the wagon-tongue is raised or lowered, as may be desired.

The support A is also held in place, and connected with the tongue, as shown in Fig. 3, by a clamp, C, passing around the support, and over a bolt, D, which joins the tongue to the wagon-body.

The clamp is preferably made of round malleable iron; but it may be made of steel or ordinary cast-iron, and may be flat instead of round.

The support may be made with both sides alike, and thus be reversible; but such a form is not necessary.

Having thus stated my invention, I claim—

1. A wagon-tongue support having its rear end conformed to and connected with the axle, as shown, and its forward end enlarged and provided with a screw, substantially as and for the purposes described.

2. The adjustable reversible screw B, provided with the flat plates $c$ and $c'$, as shown and described.

3. A reversible wagon-tongue support composed of the support A, in combination with the clamp C, the adjustable reversible screw B, with plates $c$ and $c'$ mounted at each end, substantially as and for the purposes described.

In testimony whereof I have signed my name to this specification in the presence of two subscribing witnesses.

JAS. M. HUNTER.

Witnesses:
W. F. COGSWELL,
GEO. S. SANDS.